(12) United States Patent
Sugiyama et al.

(10) Patent No.: US 11,240,141 B2
(45) Date of Patent: Feb. 1, 2022

(54) TIME PATH SELECTION DEVICE AND TIME PATH SELECTION METHOD

(71) Applicant: Nippon Telegraph and Telephone Corporation, Tokyo (JP)

(72) Inventors: Ryuta Sugiyama, Tokyo (JP); Kaoru Arai, Tokyo (JP); Hiroki Sakuma, Tokyo (JP); Takaaki Hisashima, Tokyo (JP); Shunichi Tsuboi, Tokyo (JP); Osamu Kurokawa, Tokyo (JP); Kazuyuki Matsumura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 21 days.

(21) Appl. No.: 16/971,507

(22) PCT Filed: Feb. 15, 2019

(86) PCT No.: PCT/JP2019/005665
§ 371 (c)(1),
(2) Date: Aug. 20, 2020

(87) PCT Pub. No.: WO2019/163680
PCT Pub. Date: Aug. 29, 2019

(65) Prior Publication Data
US 2020/0403901 A1 Dec. 24, 2020

(30) Foreign Application Priority Data

Feb. 22, 2018 (JP) .............................. JP2018-029262

(51) Int. Cl.
*H04L 12/721* (2013.01)
*H04B 7/185* (2006.01)
(Continued)

(52) U.S. Cl.
CPC ....... *H04L 45/123* (2013.01); *H04B 7/18513* (2013.01); *H04J 3/0679* (2013.01); *H04J 3/14* (2013.01)

(58) Field of Classification Search
CPC ... H04L 45/123; H04L 45/24; H04B 7/18513; H04J 3/0679; H04J 3/14; H04W 40/22
See application file for complete search history.

(56) References Cited

U.S. PATENT DOCUMENTS

| | | | |
|---|---|---|---|
| 2009/0161744 A1* | 6/2009 | Smith | H04B 3/462 |
| | | | 375/226 |
| 2011/0122775 A1* | 5/2011 | Zampetti | H04L 45/00 |
| | | | 370/242 |

(Continued)

FOREIGN PATENT DOCUMENTS

| | | |
|---|---|---|
| JP | 2002252638 | 9/2002 |
| JP | 200965579 | 3/2009 |

(Continued)

OTHER PUBLICATIONS

[No Author Listed]. "IEEE Standard for a Precision Clock Synchronization Protocol for Networked Measurement and Control Systems," IEEE Std, Jul. 24, 2008, 289 pages.

*Primary Examiner* — Pao Sinkantarakorn
*Assistant Examiner* — Kabir U Jahangir
(74) *Attorney, Agent, or Firm* — Fish & Richardson P.C.

(57) ABSTRACT

[Problem] To select an optimal transmission path having a minimum total MTIE value of total MTIE values between a plurality of master apparatuses configured to transmit time information serving as a reference and a specific relay apparatus configured to receive the time information via a plurality of relay apparatuses to achieve time synchronization.
[Solution] A time path selection apparatus 30 selects a transmission path employed for time synchronization, on the (Continued)

basis of a MTIE value evaluated in each of relay apparatuses 13 to 16, between master apparatuses 11 and 12 configured to transmit time information serving as a reference and a relay apparatus 15 or 16 at an edge configured to receive the time information via a relay apparatus 13 or 14 to achieve the time synchronization. The time path selection apparatus 30 includes a time information reception unit 31 configured to receive the MTIE value evaluated in each of the relay apparatuses 13 to 16, and an optimal path derivation unit 33 configured to evaluate, on the basis of the received MTIE value, a total MTIE value for every transmission path in transmission paths between the relay apparatus 15 and the master apparatuses 11 and 12 and to select and derive, as the transmission path employed for the transmission path for time synchronization, a transmission path where the total MTIE value is a minimum (170 ns).

7 Claims, 7 Drawing Sheets

(51) Int. Cl.
*H04J 3/06* (2006.01)
*H04J 3/14* (2006.01)

(56) References Cited

U.S. PATENT DOCUMENTS

| | | | |
|---|---|---|---|
| 2012/0250704 A1 | 10/2012 | Yamada et al. | |
| 2013/0121351 A1 | 5/2013 | Miyabe | |
| 2015/0381451 A1* | 12/2015 | Kolotov | H04J 3/14 |
| | | | 709/224 |

FOREIGN PATENT DOCUMENTS

| | | |
|---|---|---|
| JP | 2012209791 | 10/2012 |
| JP | 2013104772 | 5/2013 |
| JP | 2016152488 | 8/2016 |

* cited by examiner

TIME PATH SELECTION DEVICE AND TIME PATH SELECTION METHOD

CROSS-REFERENCE TO RELATED APPLICATIONS

This application is a National Stage application under 35 U.S.C. § 371 of International Application No. PCT/JP2019/005665, filed on Feb. 15, 2019, which claims the benefit of Japanese Patent Application No. 2018-029262, filed on Feb. 22, 2018. The disclosures of the prior applications are incorporated by reference in their entirety.

TECHNICAL FIELD

The present disclosure relates to a time path selection apparatus capable of selecting an optimal transmission path between a specific relay apparatus and a master apparatus while achieving highly accurate time synchronization between the master apparatus configured to receive time information from global positioning systems (GPSs) and a plurality of relay apparatuses, and a time path selection method therefor.

BACKGROUND ART

There is a growing demand for systems and services requiring highly accurate and highly reliable time synchronization. A generally known method for achieving highly accurate time synchronization is a method including receiving, by a master apparatus (communication apparatus), time information from GPSs. In a case where time synchronization is achieved in a communication system having a wide communication area, it is possible to employ a method for achieving time synchronization between a plurality of master apparatuses serving as a reference time and a plurality of relay apparatuses (communication apparatuses) connected with the master apparatuses over a wired network. If a first master apparatus of the plurality of master apparatuses fails, time information should be highly accurately transmitted over a network from a normal second master apparatus of the plurality of master apparatuses. A redundant configuration is commonly employed in transmitting time information over a network in order to ensure reliability in failures and the like.

An example of a method of achieving time synchronization includes a method employing Precision Time Protocol (PTP). In the PTP, a PTP packet including time information is exchanged between a master apparatus and a slave apparatus serving as a relay apparatus, which face to each other, and time in the slave apparatus is corrected on the basis of time in the master apparatus to achieve the time synchronization.

An example of a method for determining an optimal path in the redundant configuration of the time synchronization network includes a method employing a Best Master Clock Algorithm (BMCA) function of the PTP. In the BMCA function, a slave apparatus can have a redundant configuration for two master apparatuses. In this case, each of the master apparatuses periodically notifies the slave apparatus of time information as an announcing message. The slave apparatus determines that transmission delay is minimum from the received time information to select the optimal master apparatus, on the basis of the algorithm in the BMCA function, as follows.

Figure 6:
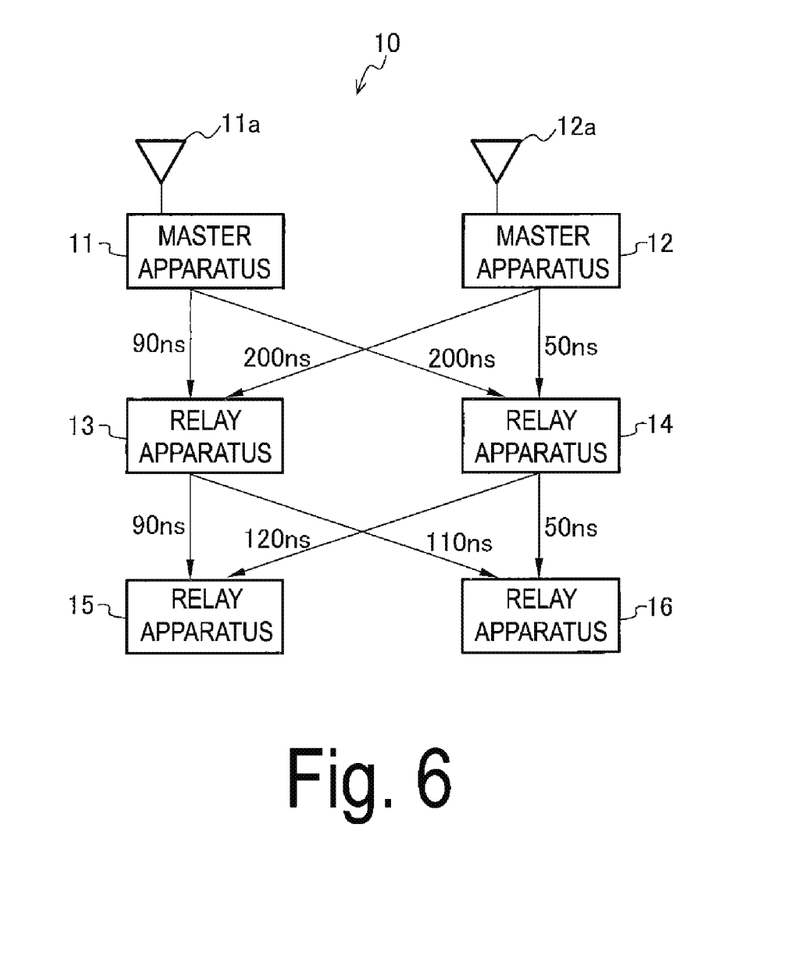
FIG. 6 is a block diagram illustrating a configuration of a communication system for performing a known time synchronization process.

For example, a communication system 10 illustrated in FIG. 6 includes two master apparatuses 11 and 12 configured to receive, through antennas 11a and 12a, time information serving as a reference time from unillustrated GPSs, and a plurality of relay apparatuses 13, 14, 15, and 16, which are configured to be connected to each other through a wired transmission path. In this configuration, a Maximum Time Interval Error (MTIE) value, described below, between the master apparatus 11 and the relay apparatus 13 is 90 ns, and a MTIE value between the master apparatus 11 and the relay apparatus 14 is 200 ns. Other MTIE values may be found in FIG. 6.

Here, such a MTIE value will be described. When the relay apparatus 13 receives a transmission packet from the master apparatus 11, for example, to which the above-described PTP is applied, a difference between two time periods, that is, a reference transmission delay time period being a difference between a time where the packet is received and a time where the packet is transmitted, and an actual transmission delay time period in a case where a delay fluctuation occurs in the packet transmission is referred to as time interval error (TIE: offset). Note that it is assumed that the reference transmission delay time period has no delay fluctuation in the packet transmission.

Figure 7:
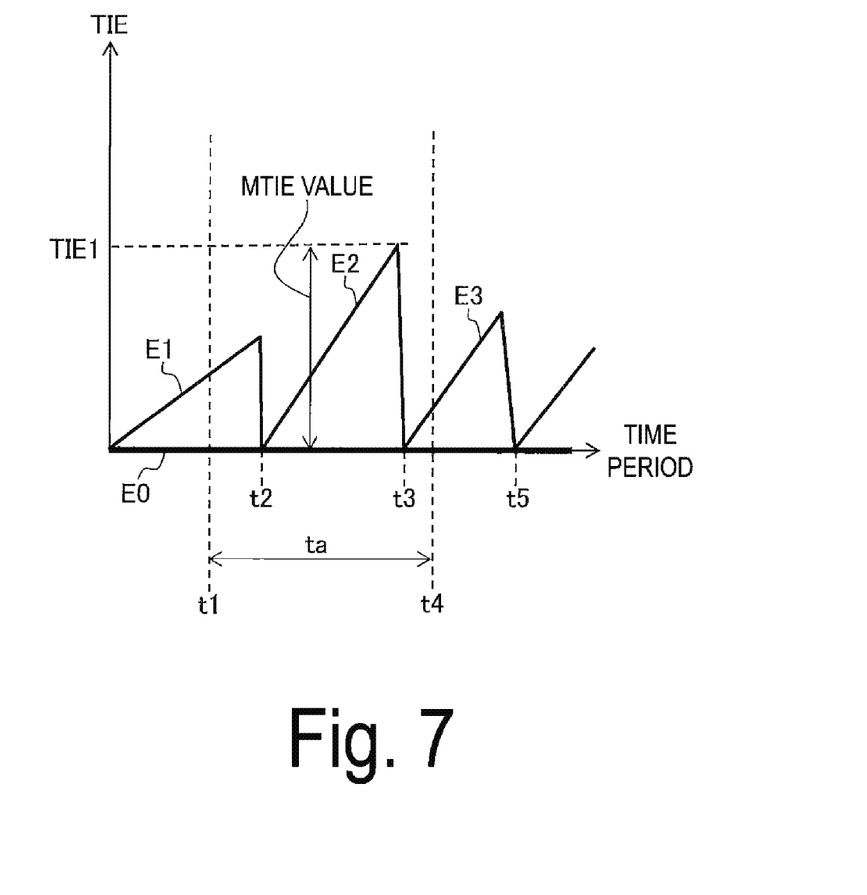
FIG. 7 is a graph showing a relationship between a TIE (offset) on the vertical axis and a time period on the horizontal axis.

FIG. 7 is a graph showing a relationship between the TIE (offset) on the vertical axis and a time period on the horizontal axis. If the packet transmission has no delay fluctuation, the TIE (offset) is 0, as represented by a line E0 on the horizontal axis in FIG. 7, and exact time synchronization is achieved between the master apparatus 11 and the relay apparatus 13.

On the other hand, if the packet transmission has delay fluctuation, TIEs occur as represented by diagonal lines E1, E2, and E3 in FIG. 7. The TIEs gradually increase, and thus, the relay apparatus 13 performs processes for eliminating the TIEs (achieving TIE=0) as indicated by times t2, t3, and t5 in FIG. 7.

Here, it is assumed that a maximum offset (TIE1) occurs due to large delay fluctuation, for example, during a one-day period to between times t1 and t4. This maximum TIE1 15 called a MTIE value. The MTIE value is a value such as 50 ns and 200 ns between each of the master apparatuses 11 and 12 and the plurality of relay apparatuses 13 to 16 illustrated in FIG. 6. The relay apparatuses 13 to 16 have a function of evaluating the MTIE value.

The relay apparatus 13 has a function of comparing the MTIE value of 90 ns with the master apparatus 11 being one of the master apparatuses 11 and 12 and the MTIE value of 200 ns with the master apparatus 12 being the other of the master apparatuses 11 and 12 and selecting the master apparatus 11 connected through a transmission path having a smaller MTIE value (90 ns). The other relay apparatuses 14 to 16 also have the same function.

For example, the lowest relay apparatus 15 at the edge as viewed from the uplink side compares the MTIE value of 90 ns with the relay apparatus 13 on a first uplink side and the MTIE value of 120 ns with the relay apparatus 14 on a second uplink side and selects the relay apparatus 13 connected through a transmission path having a smaller MTIE value (90 ns). Thus, the relay apparatus 15 at the edge selects the optimal master apparatus 11 connected through the transmission path via the relay apparatus 13. This type of technology can be found in NPL 1.

CITATION LIST

Non Patent Literature

NPL 1: IEEE Std 1588-2008 (Revision of IEEE Std 1588-2002)-IEEE Standard for a Precision Clock Synchronization Protocol for Networked Measurement and Control Systems.

SUMMARY OF THE INVENTION

Technical Problem

However, in an algorithm for selecting a relay apparatus on the uplink side having a smaller MTIE value as illustrated in FIG. 6 described above, the master apparatus 12 where a total MTIE value is minimum may not be selected in a whole path from the relay apparatus 15 at the edge via the plurality of relay apparatuses 13 and 14 to the highest master apparatuses 11 and 12.

For example, the relay apparatus 15 at the edge selects the relay apparatus 13 connected through the transmission path having the smaller MTIE value of 90 ns and the master apparatus 11 connected through the transmission path having the smaller MTIE value of 90 ns on the uplink side of the relay apparatus 13. In this case, a total MTIE value between the master apparatus 11 and the relay apparatus 15 at the edge is 90 ns+90 ns=180 ns.

However, a total MTIE value between the relay apparatus 15 at the edge and the master apparatus 12 being another master apparatus connected via the relay apparatus 14 being another relay apparatus is 170 ns, that is, 50 ns+120 ns in order from a side of the master apparatus 12. The MTIE value of 170 ns is smaller than the MTIE value of 180 ns described above. In other words, the relay apparatus 15 at the edge may not select the master apparatus 12 via the optimal transmission path having the minimum MTIE value. Thus, a known path selection algorithm has a problem in that it is not possible to select a master apparatus via an optimal transmission path having a minimum total MTIE value.

The present disclosure has been achieved in view of the foregoing, and an advantage of some aspects of the disclosure is to provide a time path selection apparatus capable of selecting an optimal transmission path having a minimum total MTIE value, between a plurality of master apparatuses configured to transmit time information serving as a reference and a specific relay apparatus configured to receive the time information via a plurality of relay apparatuses to achieve time synchronization, and a time path selection method therefor.

Means for Solving the Problem

As a solution for solving the above-described problems, the invention according to claim 1 is a time path selection apparatus for selecting a transmission path employed for time synchronization, on the basis of Maximum Time Interval Error (MTIE) values evaluated in a plurality of relay apparatuses, between a plurality of master apparatuses configured to transmit time information serving as a reference and a specific relay apparatus configured to receive the time information via a plurality of relay apparatuses to achieve the time synchronization. The apparatus includes: a reception unit configured to receive MTIE values evaluated by all the relay apparatuses connected to downlink transmission paths of the master apparatuses; and a derivation unit configured to evaluate total MTIE values for every transmission path in transmission paths between the specific relay apparatus and the plurality of master apparatuses via the plurality of relay apparatuses and derive a transmission path having a minimum total MTIE value out of the total MTIE values, as the transmission path employed for the time synchronization.

The invention according to claim 5 is a time path selection method performed by a time path selection apparatus, the method for selecting a transmission path employed for time synchronization, on the basis of Maximum Time Interval Error (MTIE) values evaluated in a plurality of relay apparatuses, between a plurality of master apparatuses configured to transmit time information serving as a reference and a specific relay apparatus configured to receive the time information via a plurality of relay apparatuses to achieve the time synchronization. The time path selection apparatus executes: receiving the MTIE values evaluated by all the relay apparatuses connected to downlink transmission paths of the master apparatuses; and evaluating total MTIE values for every transmission path in transmission paths between the specific relay apparatus and the plurality of master apparatuses via the plurality of relay apparatuses and deriving a transmission path having a minimum total MTIE value out of the total MTIE values, as the transmission path employed for the time synchronization.

According to the configuration in claim 1 and the method in claim 5, the following operation and effect can be obtained. There are the plurality of transmission paths between the plurality of master apparatuses configured to transmit time information serving as a reference and the specific relay apparatus configured to receive the time information via the plurality of relay apparatus to achieve the time synchronization. In the present invention, total MTIE values for every transmission path in the plurality of transmission paths are evaluated to derive the transmission path having a minimum total MTIE value out of the total MTIE values, as the transmission path employed for the time synchronization. That is, in each of the transmission paths between the master apparatuses and the specific relay apparatus via the plurality of relay apparatuses, it is possible to select the optimal transmission path having a minimum total MTIE value.

The invention according to claim 2 is the time path selection apparatus according to claim 1, further including: a transmission unit configured to notify, of optimal path information, a master apparatus, a relay apparatus, and a specific relay apparatus on a transmission path indicated in the optimal path information, where the optimal path information is related to information on the transmission path employed for the time synchronization derived by the derivation unit.

According to such a configuration, the transmission unit notifies each of the master apparatus, the specific relay apparatus on the optimal transmission path, and the relay apparatus connected therebetween, of the optimal path information. As a result, it is possible to establish a setting whereby the master apparatus and the specific relay apparatus on the optimal transmission path communicate on the optimal path via the relay apparatus connected between the master apparatus and the specific relay apparatus, on the basis of the notified optimal path information.

The invention according to claim 3 is the time path selection apparatus according to claim 1, in which the derivation unit evaluates a total MTIE value so that a difference in total MTIE value between a plurality of the specific relay apparatuses is equal to or less than a prescribed value, where the total MTIE value is obtained between each of the master apparatuses and each of the plurality of the specific relay apparatuses, and a total MTIE value in each of the specific relay apparatuses is a minimum value, and derives a transmission path for the evaluated total MTIE value as the transmission path employed for the time synchronization in each of the specific relay apparatuses.

According to such a configuration, the following operation and effect can be obtained. For example, a configuration in which mobile base stations are connected to the specific relay apparatuses respectively is assumed. Note that it is assumed that the base stations may optimally communicate if a difference in total MTIE value on the uplink side between the specific relay apparatuses connected with the base stations is small and if each of the total MTIE values is smaller. Such conditions for the base stations can be satisfied by the time path selection apparatus, and thus, if the mobile base stations are connected to the specific relay apparatuses respectively, the mobile base stations may appropriately communicate.

The invention according to claim 4 is a time path selection apparatus, included in a plurality of relay apparatuses, for performing a process for selecting a transmission path employed for time synchronization, on the basis of MTIE values evaluated in the plurality of relay apparatuses, between a plurality of master apparatuses configured to transmit time information serving as a reference and a specific relay apparatus configured to receive the time information via a plurality of relay apparatuses to achieve the time synchronization. The apparatus includes: a storage unit configured to store a minimum MTIE value of MTIE values between a relay apparatus including the storage unit and each of the master apparatuses or each of the relay apparatuses, which are directly connected to an uplink side of the relay apparatus and a path ID of a transmission path for the minimum value; a minimum value reception unit configured to receive a minimum MTIE value stored in a storage unit of each of the relay apparatuses directly connected to the uplink side and a path ID of a transmission path for the minimum MTIE value, from each of the relay apparatuses directly connected to the uplink side; a total value calculation unit configured to calculate, for each of the relay apparatuses on the uplink side, a total value obtained by totaling the minimum MTIE value from the relay apparatus on the uplink side related to the received path ID and a MTIE value between the relay apparatus on the uplink side and the relay apparatus; a selection unit configured to select, as the transmission path employed for the time synchronization, a transmission path for a minimum value of the calculated total value for each of the relay apparatuses on the uplink side; and a transmission unit configured to transmit information on the selected transmission path employed for the time synchronization to the relay apparatus on the uplink side related to the transmission path in the information.

The invention according to claim 6 is a time path selection method performed by a time path selection apparatus, included in a plurality of relay apparatuses, the method for performing a process for selecting a transmission path employed for time synchronization, on the basis of MTIE values evaluated in the plurality of relay apparatuses, between a plurality of master apparatuses configured to transmit time information serving as a reference and a specific relay apparatus configured to receive the time information via a plurality of relay apparatuses to achieve the time synchronization. The time path selection apparatus executes: storing a minimum MTIE value of MTIE values between a relay apparatus including the time path selection apparatus and each of the master apparatuses or each of the relay apparatuses, which are directly connected to an uplink side of the relay apparatus and a path ID of a transmission path for the minimum MTIE value; receiving a minimum MTIE value stored in each of the relay apparatuses directly connected to the uplink side and a path ID of a transmission path for the minimum MTIE value, from each of the relay apparatuses directly connected to the uplink side; calculating, for each of the relay apparatuses on the uplink side, a total value obtained by totaling the minimum MTIE value from the relay apparatus on the uplink side related to the received path ID and a MTIE value between the relay apparatus on the uplink side and the relay apparatus; selecting, as the transmission path employed for the time synchronization, a transmission path for a minimum value of the calculated total value for each of the relay apparatuses on the uplink side; and transmitting information on the selected transmission path employed for the time synchronization to the relay apparatus on the uplink side related to the transmission path in the information.

According to the configuration in claim 4 and the method in claim 6, the following operation and effect can be obtained. The information on the transmission path employed for the time synchronization, the information received in the relay apparatus on the uplink side (optimal path information), indicates that the transmission path employed for the time synchronization is the transmission path extending from the specific relay apparatus via the relay apparatus to each of the master apparatuses, where the total MTIE value between each of the master apparatuses and the plurality of relay apparatuses is the minimum value. Thus, the relay apparatus that has received the optimal path information may communicate through the optimal path through which the time information from each of the master apparatuses is received and transmitted to the specific relay apparatus, on the basis of the optimal path information.

Effects of the Invention

According to the present invention, it is possible to provide a time path selection apparatus capable of selecting an optimal transmission path having a minimum total MTIE value of total MTIE values between a plurality of master apparatuses configured to transmit time information serving as a reference and a specific relay apparatus configured to receive the time information via a plurality of relay apparatuses to achieve time synchronization and a time path selection method therefor.

DESCRIPTION OF EMBODIMENTS

Embodiments of the present invention will be described below with reference to the drawings.

Configuration of First Embodiment

Figure 1:
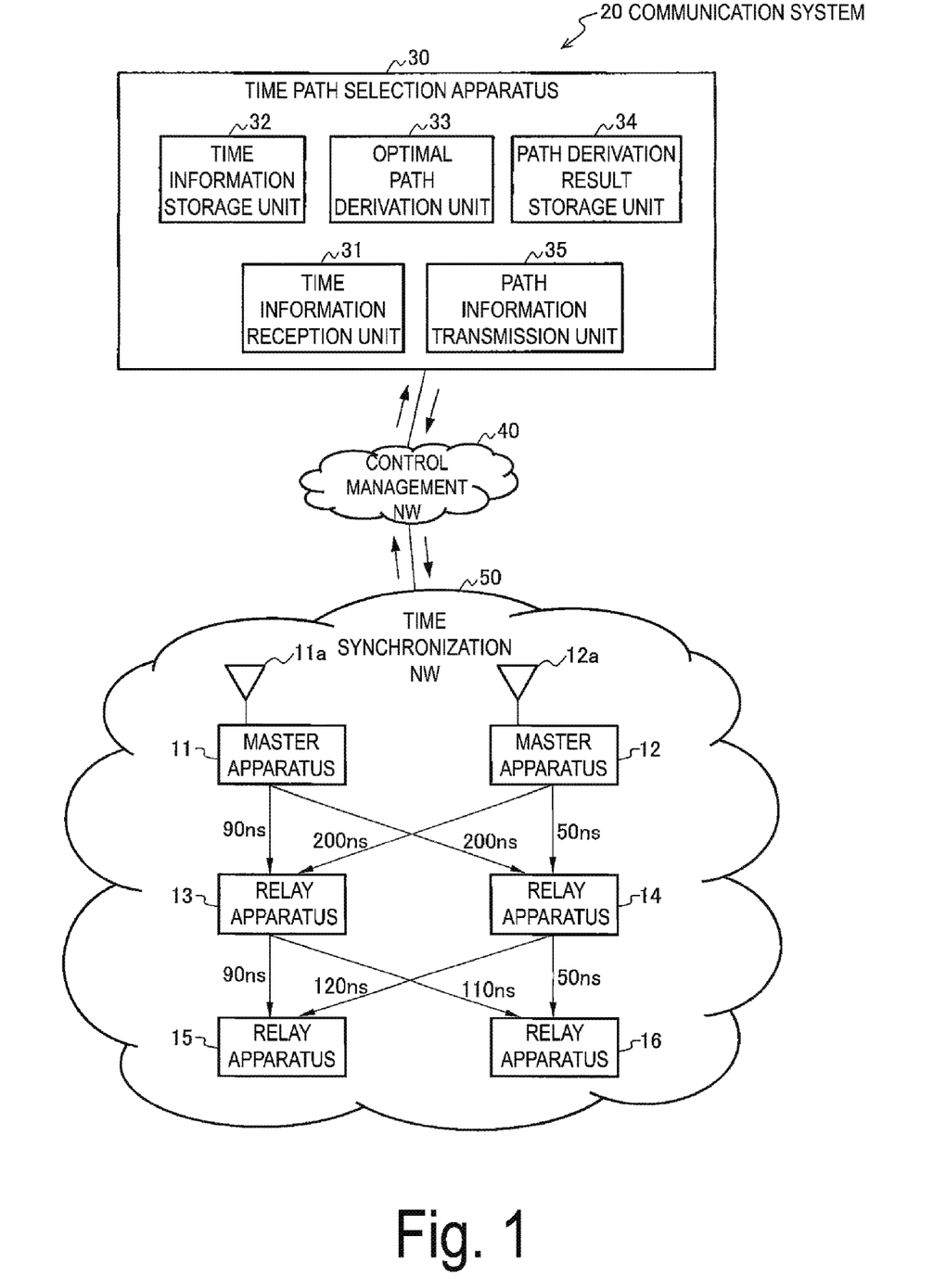
FIG. 1 is a block diagram illustrating a configuration of a communication system employing a time path selection apparatus according to a first embodiment of the present disclosure.

FIG. 1 is a block diagram illustrating a configuration of a communication system employing a time path selection apparatus according to a first embodiment of the present invention.

A communication system 20 illustrated in FIG. 1 is configured so that a time path selection apparatus 30 is connected via a control management network (NW) 40 to a time synchronization NW 50.

The time path selection apparatus 30 includes a time information reception unit (also referred to as a reception unit) 31, a time information storage unit 32, an optimal path derivation unit (also referred to as a derivation unit) 33, a path derivation result storage unit (also referred to as a result storage unit) 34, and a path information transmission unit (also referred to as a transmission unit) 35.

The time synchronization NW 50 has a configuration in which a plurality of master apparatuses serving as a reference time are provided, time synchronization between a plurality of relay apparatuses and the plurality of master apparatuses is achieved. The time synchronization NW 50 has a configuration in which two master apparatuses 11 and 12 configured to receive time information via antennas 11a and 12a from unillustrated GPSs and a plurality of relay apparatuses 13, 14, 15, and 16 are mutually connected through a transmission path. Note that the number of master apparatuses and the number of relay apparatuses are not limited to this example.

In this configuration, a MTIE value between the master apparatus 11 and the relay apparatus 13 is 90 ns, and a MTIE value between the master apparatus 11 and the relay apparatus 14 is 200 ns. In addition, a MTIE value between the master apparatus 12 and the relay apparatus 13 is 200 ns, and a MTIE value between the master apparatus 12 and the relay apparatus 14 is 50 ns. A MTIE value between the relay apparatus 13 and the relay apparatus 15 at the edge is 90 ns, and a MTIE value between the relay apparatus 13 and the relay apparatus 16 at the edge is 110 ns. A MTIE value between the relay apparatus 14 and the relay apparatus 15 at the edge is 120 ns, and a MTIE value between the relay apparatus 14 and the relay apparatus 16 at the edge is 50 ns. Note that the relay apparatuses 15 and 16 at the edges configure a specific relay apparatus described in the claims.

The master apparatuses 11 and 12 and the relay apparatuses 13 to 16 are connected to the time path selection apparatus (also referred to as a selection apparatus) 30 via the control management NW 40. Each of the connected relay apparatuses 13 to 16 detects a MTIE value between relay apparatuses 13 to 16 directly connected to each other and transmits the detected MTIE value to the selection apparatus 30.

In the selection apparatus 30 illustrated in FIG. 1, the reception unit 31 receives the MTIE value transmitted from the relay apparatuses 13 to 16 via the control management NW 40, and the time information storage unit 32 stores the received MTIE value.

The optimal path derivation unit 33 evaluates a minimum value of total MTIE values between each of the master apparatuses 11 and 12 and the relay apparatus (for example, the relay apparatus 15) at the edge to derive, as an optimal path (transmission path employed for time synchronization), the transmission path between the master apparatus (for example, the master apparatus 12) and the relay apparatus 15 at the edge via the transmission path having the minimum value. A specific example of the derivation will be described. Note that the minimum value can be evaluated by a well-known method such as a Dijkstra method or a mathematical programming.

For example, the total MTIE value in all the transmission paths between each of the master apparatuses 11 and 12 and the relay apparatus 15 at the edge includes four patterns (1) to (4) as follows:

(1) The total MTIE value from the master apparatus 11 to the relay apparatus 15 at the edge via the relay apparatus 13 is 90 ns+90 ns=180 ns.

(2) The total MTIE value from the master apparatus 11 to the relay apparatus 15 at the edge via the relay apparatus 14 is 200 ns+120 ns=320 ns.

(3) The total MTIE value from the master apparatus 12 to the relay apparatus 15 at the edge via the relay apparatus 13 is 200 ns+90 ns=290 ns.

(4) The total MTIE value from the master apparatus 12 to the relay apparatus 15 at the edge via the relay apparatus 14 is 50 ns+120 ns=170 ns.

The derivation unit 33 calculates each of the total values (1) to (4) and compares the total values to evaluate a minimum value of 170 ns. Thereafter, the derivation unit 33 derives, as the optimal path, a transmission path from the master apparatus 12 to the relay apparatus 15 at the edge via the relay apparatus 14, where the transmission path has a minimum value of 170 ns. Information on the derived optimal path is stored in the result storage unit 34.

The transmission unit 35 evaluates the master apparatus and the relay apparatus on the optimal path on the basis of the optimal path information stored in the result storage unit 34, and notifies the master apparatus and the relay apparatus of the optimal path information via the control management NW 40. For example, the transmission unit 35 notifies each of the master apparatus 12, the relay apparatus 14, and the relay apparatus 15 at the edge, of the optimal path information. The master apparatus 12 and the relay apparatus 15 at the edge can be set to communicate through the optimal path via the relay apparatus 14 on the basis of the notified optimal path information.

Operation of First Embodiment

Next, an operation of selecting a time path by the time path selection apparatus 30 in the communication system 20 according to the first embodiment will be described with reference to a flowchart in FIG. 2. The description is on the assumption that each of the relay apparatuses 13 to 16 evaluates MTIE values between each of the relay apparatuses 13 to 16 and each of the master apparatuses 11 and 12, and MTIE values between each of the relay apparatuses 13 to 16 and the relay apparatuses 13 to 16 other than the relay apparatuses 13 to 16.

Figure 2:
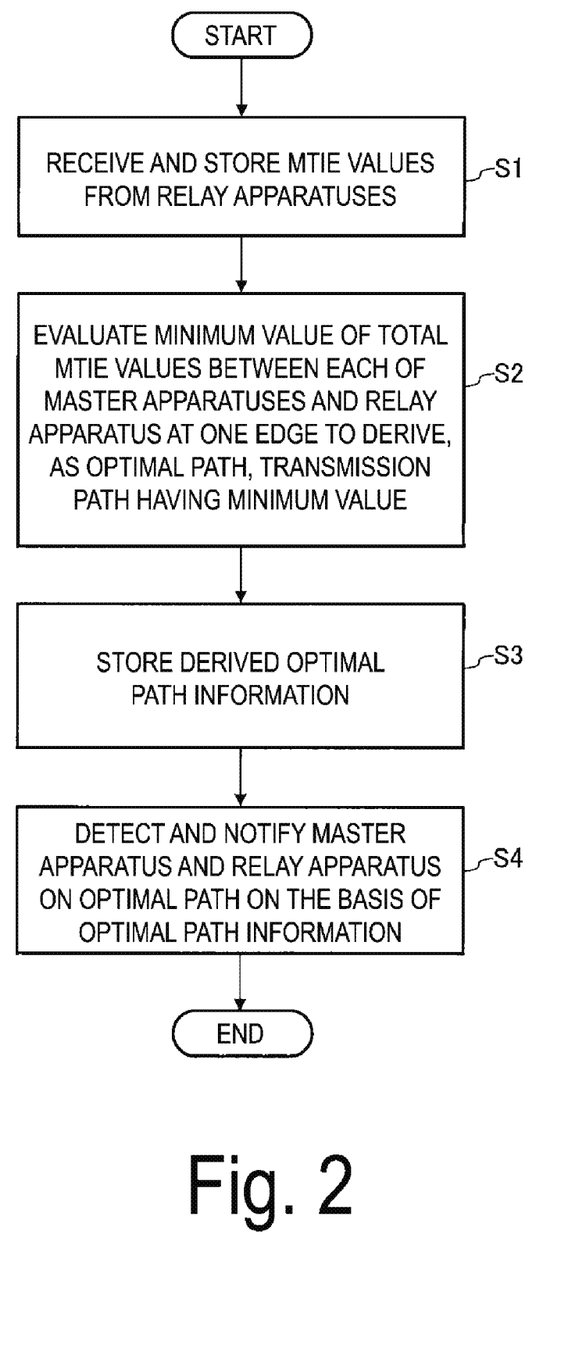
FIG. 2 is a flowchart for explaining an operation of selecting a time path by the time path selection apparatus according to the first embodiment.

In step S1 illustrated in FIG. 2, the reception unit 31 of the selection apparatus 30 receives, via the control management NW 40, MTIE values transmitted from the relay apparatuses 13 to 16, and the time information storage unit 32 stores the received MTIE values.

In step S2, the derivation unit 33 evaluates a minimum value of total MTIE values between each of the master apparatuses 11 and 12 and the relay apparatus at the edge (for example, the relay apparatus 15), and derives, as the optimal path, the transmission path, via the transmission path having the minimum value, between the master apparatus 11 or 12 and the relay apparatus 15 at the edge. For example, it is assumed that the derivation unit 33 evaluates, as the MTIE value, a minimum total MTIE value of 170 ns from the master apparatus 12 to the relay apparatus 15 at the edge via the relay apparatus 14. The derivation unit 33 derives, as the optimal path, the transmission path having the MTIE value of 170 ns.

The information on the derived optimal path is stored in the result storage unit 34 in step S3.

In step S4, the transmission unit 35 detects the master apparatus 12 and the relay apparatuses 14 and 15 on the optimal path on the basis of the optimal path information stored in the result storage unit 34, and notifies the master apparatus 12 and the relay apparatuses 14 and 15 of the optimal path information via the control management NW 40. The master apparatus 12 and the relay apparatus 15 at the edge are set to communicate through the optimal path via the relay apparatus 14 on the basis of the notified optimal path information.

Effect of First Embodiment

An effect of the time path selection apparatus 30 according to the first embodiment will be described. The time path selection apparatus 30 selects a transmission path employed for time synchronization, on the basis of a MTIE value evaluated in each of the relay apparatuses 13 to 16, between the plurality of master apparatuses 11 and 12 configured to transmit time information serving as a reference and the specific relay apparatus 15 or 16 configured to receive the time information via the plurality of relay apparatuses 13 and 14 to achieve the time synchronization.

(1) The time path selection apparatus 30 includes the reception unit 31 and the derivation unit 33.

The reception unit 31 receives MTIE values evaluated by all the relay apparatuses 13 to 16 connected to the master apparatuses 11 and 12 at a side of the downlink transmission path of the master apparatuses 11 and 12.

The derivation unit 33 evaluates the total MTIE values (total MTIE values) for each of transmission paths in transmission paths between the relay apparatus 15 at the edge, for example, serving as a specific relay apparatus, and the plurality of master apparatuses 11 and 12 via the plurality of relay apparatuses 13 and 14. Furthermore, the derivation unit 33 selects the transmission path having the minimum total MTIE value (170 ns) of the total MTIE values to derive the transmission path as the optimal transmission path.

According to such a configuration, the following effects are obtained. There are a plurality of transmission paths between the plurality of master apparatuses 11 and 12 configured to transmit time information serving as a reference and the specific relay apparatus 15 configured to receive the time information via the plurality of relay apparatuses 13 and 14 to achieve the time synchronization. In the present embodiment, a total MTIE value for each of the plurality of transmission paths is evaluated to derive the transmission path having a minimum total MTIE value, as the optimal transmission path. That is, it is possible to select the optimal transmission path having the minimum total MTIE value (170 ns) of total MTIE values in transmission paths between the master apparatus 12 and the specific relay apparatus 15 via the plurality of relay apparatuses 13 and 14.

(2) The time path selection apparatus 30 further includes the transmission unit 35 configured to notify the master apparatus 12, the relay apparatus 13, and the relay apparatus 15 at the edge on the optimal transmission path indicated in the optimal path information, of the optimal path information on the information on the transmission path employed for the time synchronization derived by the derivation unit 33.

According to such a configuration, the transmission unit 35 notifies the master apparatus 12 and the relay apparatus 15 at the edge on the optimal transmission path, and the relay apparatus 13 connected therebetween, of the optimal path information. As a result, the master apparatus 12 and the relay apparatus 15 at the edge on the optimal transmission path can be set to communicate through the optimal path via the relay apparatus 13 connected between the master apparatus 12 and the relay apparatus 15 at the edge on the basis of the notified optimal path information.

Configuration of Second Embodiment

Figure 3:
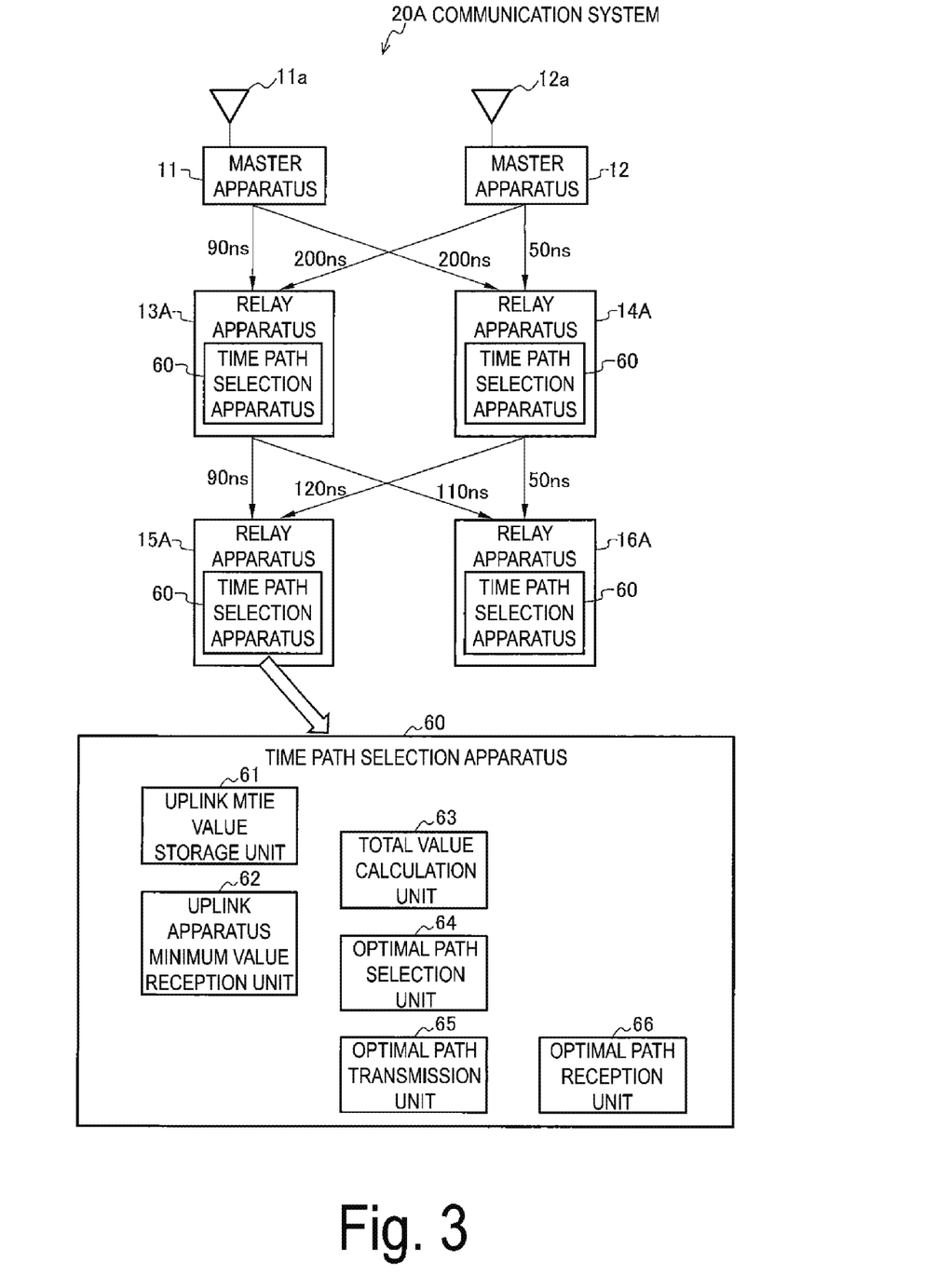
FIG. 3 is a block diagram illustrating a configuration of a communication system employing a time path selection apparatus according to a second embodiment of the present disclosure.

FIG. 3 is a block diagram illustrating a configuration of a communication system employing a time path selection apparatus according to a second embodiment of the present invention.

The master apparatuses 11 and 12 and relay apparatuses 13A to 16A in a communication system 20A illustrated in FIG. 3 have connection configurations similar to those of the master apparatuses 11 and 12 and the relay apparatuses 13 to 16 in FIG. 1 described above, but differ in that each of the relay apparatuses 13A to 16A includes a time path selection apparatus 60.

The time path selection apparatus 60 includes an uplink MTIE value storage unit (also referred to as a storage unit) 61, an uplink apparatus minimum value reception unit (also referred to as a minimum value reception unit) 62, a total value calculation unit 63, an optimal path selection unit (also referred to as a selection unit) 64, an optimal path transmission unit (also referred to as a transmission unit) 65, and an optimal path reception unit 66.

The storage unit 61 stores a minimum MTIE value of MTIE values between a relay apparatus (relay apparatus including the storage unit 61) and a plurality of relay apparatuses or a master apparatus, which are directly connected to the uplink side of the relay apparatus and the path identification (ID) of the transmission path for the minimum MTIE value. For example, the storage unit 61 of the relay apparatus 15A at the edge stores the minimum MTIE value of 90 ns, out of the MTIE values of 90 ns and 120 ns between the relay apparatus 15A at the edge and the plurality of relay apparatuses 13A and 14A directly connected to the uplink side of the relay apparatus 15A, and the path ID of the transmission path for the minimum MTIE value of 90 ns. The path ID is referenced when processing is performed in the time path selection apparatus 60.

Similarly, for example, the storage unit 61 of the relay apparatus 13A stores the minimum MTIE value of 90 ns on the uplink side and the path ID therefor. The storage unit 61 of the relay apparatus 14A stores the minimum MTIE value of 50 ns on the uplink side and the path ID therefor.

The minimum value reception unit 62 receives the minimum MTIE value in a plurality of uplink transmission paths and the path ID of the transmission path for the minimum MTIE value, stored for each of the plurality of relay apparatuses directly connected to the uplink side of a relay apparatus (relay apparatus including the minimum value reception unit 62). It is assumed that the received minimum MTIE value and path ID are held in a holding unit (not illustrated) of the minimum value reception unit 62. The path ID is referenced when processing is performed in the time path selection apparatus 60.

For example, the minimum value reception unit 62 of the relay apparatus 15A receives the minimum MTIE value of 90 ns stored in the relay apparatus 13A being one of the relay apparatuses directly connected to the uplink side of the relay apparatus 15A, and the path ID for the MTIE value of 90 ns, and in addition, receives the minimum MTIE value of 50 ns stored in the relay apparatus 14A being the other of the relay apparatuses and the path ID for the MTIE value of 50 ns.

The total value calculation unit 63 calculates, for each of the relay apparatuses on the uplink side, a total value obtained by totaling the minimum MTIE value from each of the uplink relay apparatuses received by the minimum value reception unit 62 and the MTIE value between the uplink relay apparatus and the relay apparatus. It is assumed that the calculated total value for each of the relay apparatuses on the uplink side is held in the holding unit (not illustrated) of the total value calculation unit 63.

For example, the total value calculation unit 63 of the relay apparatus 15A evaluates the total value of 180 ns by totaling the minimum MTIE value of 90 ns from the relay apparatus 13A being one of the relay apparatuses on the uplink side, received in the minimum value reception unit 62 and the MTIE value of 90 ns between the relay apparatus 13A and the relay apparatus 15A. Furthermore, the total value calculation unit 63 evaluates the total value of 170 ns by totaling the minimum MTIE value of 50 ns from the other of the relay apparatus 14A being the other of the relay apparatuses on the uplink side and the MTIE value of 120 ns between the relay apparatus 14A and the relay apparatus 15A.

The selection unit 64 selects the minimum value of the plurality of total values calculated by the total value calculation unit 63, and selects, as the optimal path, the transmission path for the minimum value. For example, the selection unit 64 of the relay apparatus 15A selects the minimum value of 170 ns from the plurality of total values of 180 ns and 170 ns, and selects, as the optimal path, the transmission path for the minimum value of 170 ns, that is, the transmission path extending from the relay apparatus 15A at the edge to the master apparatus 12 via the relay apparatus 14A.

The transmission unit 65 transmits the information on the optimal path selected by the selection unit 64, to the relay apparatus related to the optimal path. For example, the transmission unit 65 of the relay apparatus 15A transmits the information on the optimal path selected by the selection unit 64, to the relay apparatus 14A related to the optimal path.

The reception unit 66 receives the optimal path information transmitted from the relay apparatus on the downlink side. It is assumed that the received optimal path information is held in a holding unit (not illustrated) of the reception unit 66. For example, the reception unit 66 of the relay apparatus 14A receives the optimal path information transmitted from the relay apparatus 15A on the downlink side. The received optimal path information indicates that the optimal path is the transmission path extending from the relay apparatus 15A at the edge via the relay apparatus 14A to the master apparatus 12. Thus, the relay apparatus 14A may communicate through the optimal path through which the time information from the master apparatus 12 is received and transmitted to the relay apparatus 15A at the edge on the basis of the received optimal path information.

Operation of Second Embodiment

Next, an operation of selecting a time path by the time path selection apparatus 60 in the communication system 20A according to the second embodiment will be described with reference to a flowchart in FIG. 4.

The description is on the assumption that each of the relay apparatuses 13 to 16 evaluates MTIE values between each of the relay apparatuses 13 to 16 and each of the master apparatuses 11 and 12, and MTIE values between each of the relay apparatuses 13 to 16 and the relay apparatuses 13 to 16 other than the each of the relay apparatuses 13 to 16.

Figure 4:
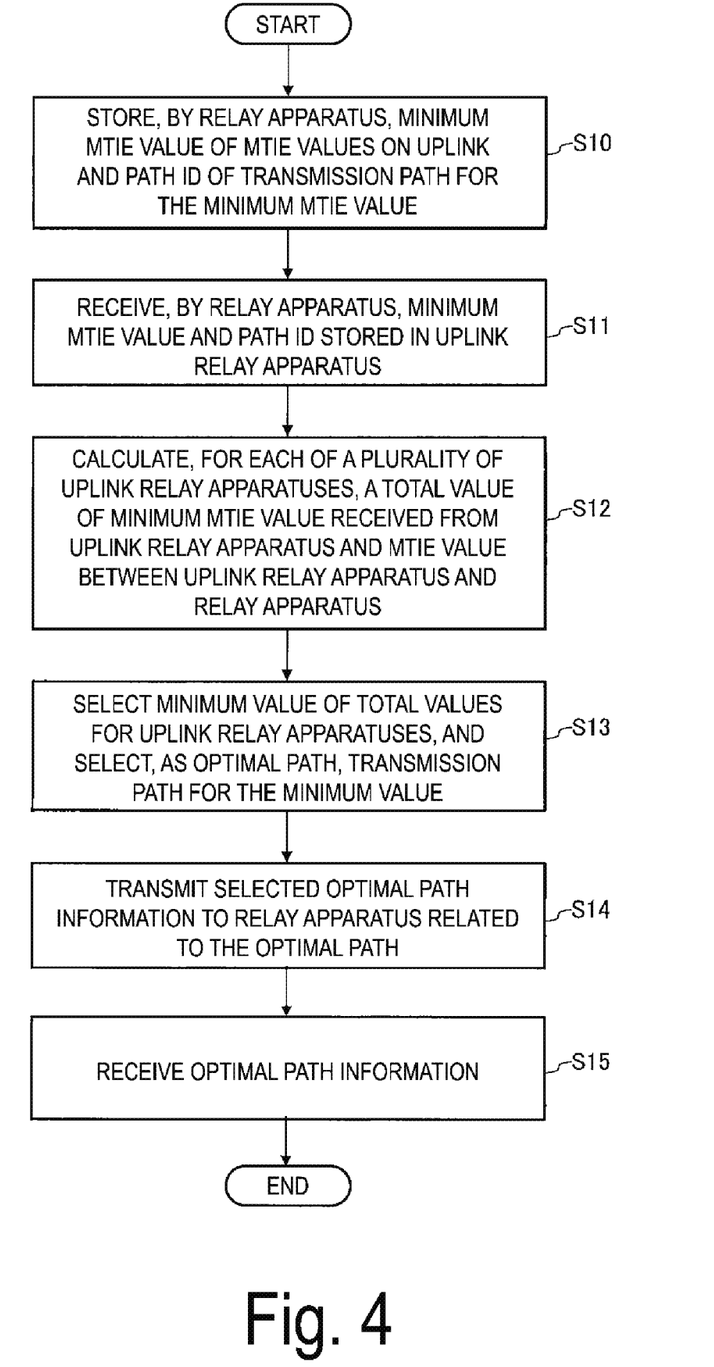
FIG. 4 is a flowchart for explaining an operation of selecting a time path by a time path selection apparatus according to the second embodiment.

In step S10 illustrated in FIG. 4, the storage unit 61 of each of the relay apparatuses 13 to 16 stores a minimum MTIE value out of MTIE values between each of the relay apparatuses 13 to 16 and a plurality of relay apparatuses or the master apparatuses, which are directly connected to the uplink side of the relay apparatuses 13 to 16, and a path ID of the transmission path for the minimum MTIE value.

The storage unit 61 of the relay apparatus 13A stores the minimum MTIE value of 90 ns on the uplink side and the path ID therefor, and the storage unit 61 of the relay apparatus 14A stores the minimum MTIE value of 50 ns on the uplink side and the path ID therefor. The storage unit 61 of the relay apparatus 15A stores the minimum MTIE value of 90 ns on the uplink side and the path ID therefor, and the storage unit 61 of the relay apparatus 16A stores the minimum MTIE value of 50 ns on the uplink side and the path ID therefor.

Next, in step S11, it is assumed that the minimum value reception unit 62 of the relay apparatus 15A at the edge receives the minimum MTIE value of 90 ns stored in the relay apparatus 13A being one of the relay apparatuses on the uplink side of the relay apparatus 15A and the path ID for the MTIE value of 90 ns, and receives the minimum MTIE value of 50 ns stored in the relay apparatus 14A being the other of the relay apparatuses and the path ID for the MTIE value of 50 ns.

In step S12, the total value calculation unit 63 of the relay apparatus 15A at the edge evaluates the total value of 180 ns by totaling the minimum MTIE value of 90 ns of the relay apparatuses 13A being one of the relay apparatuses received in step S11 and the MTIE value of 90 ns between the relay apparatus 13A and the relay apparatus 15A. Furthermore, the total value calculation unit 63 of the relay apparatus 15A evaluates the total value of 170 ns by totaling the minimum MTIE value of 50 ns of the relay apparatus 14A being the other of the relay apparatuses and the MTIE value of 120 ns between the relay apparatus 14A and the relay apparatus 15A.

In step S13, the selection unit 64 of the relay apparatus 15A at the edge selects the minimum 170 ns from the plurality of total values of 180 ns and 170 ns evaluated in step S12. Furthermore, the selection unit 64 selects, as the optimal path, the transmission path for the minimum value of 170 ns, that is, the transmission path extending from the relay apparatus 15A at the edge via the relay apparatus 14A to the master apparatus 12.

In step S14, the transmission unit 65 of relay apparatus 15A at the edge transmits the information on the optimal path selected in step S13, to the relay apparatus 14A related to the optimal path indicated in the information.

In step S15, the reception unit 66 of the relay apparatus 14A receives the optimal path information transmitted in step S14.

The relay apparatus 14A may communicate through the optimal path through which the time information from the master apparatus 12 is received and transmitted to the relay apparatus 15A at the edge on the basis of the received optimal path information.

Effect of Second Embodiment

An effect of the time path selection apparatus 60 according to the second embodiment will be described. The time path selection apparatus 60 selects the transmission path optimal for the time synchronization based on the MTIE value evaluated in each of the relay apparatuses 13 to 16, between the plurality of master apparatuses 11 and 12 configured to transmit the time information serving as a reference and the specific relay apparatus (relay apparatus at the edge) 15 or 16 configured to receive the time information via the plurality of relay apparatuses 13 and 14 to achieve the time synchronization. Furthermore, the time path selection apparatus 60 is provided in each of the relay apparatuses 13A to 16A.

(1) The time path selection apparatus 60 includes the storage unit 61, the minimum value reception unit 62, the total value calculation unit 63, the selection unit 64, and the transmission unit 65.

If the storage unit 61 is included in the relay apparatus 15A at the edge, the storage unit 61 stores the minimum value of 90 ns of the MTIE values between the relay apparatus 15A and each of the relay apparatuses 13A and 14A directly connected to the uplink side of the relay apparatus 15A, and the path ID of the transmission path for the minimum value of 90 ns. In addition, if the storage unit 61 is included in the relay apparatus 13A, the storage unit 61 stores the minimum MTIE value of 90 ns of the MTIE values between the relay apparatus 13A and each of the master apparatuses 11 and 12 directly connected to the uplink side of the relay apparatus 13A and the path ID of the transmission path for the minimum value of 90 ns. Furthermore, if the storage unit 61 is included in the relay apparatus 14A, the storage unit 61 stores the minimum MTIE value of 50 ns out of the MTIE values between the relay apparatus 14A and each of the master apparatuses 11 and 12 directly connected to the uplink side of the relay apparatus 14A and the path ID of the transmission path for the minimum value of 50 ns.

The minimum value reception unit 62 receives the stored minimum MTIE values of 90 ns and 50 ns and the path ID of the transmission path for the minimum values of 90 ns and 50 ns, from each of the relay apparatuses 13A and 14A directly connected to the uplink side.

The total value calculation unit 63 totals the minimum MTIE value of 90 ns from the relay apparatus 13A on the uplink side for the received path ID and the MTIE values of 90 ns between the relay apparatus 13A on the uplink side and the relay apparatus 15A to calculate the total value of 180 ns. Furthermore, the total value calculation unit 63 totals the minimum MTIE value of 50 ns from the relay apparatus 14A on the uplink side for the received path ID and the MTIE values of 120 ns between the relay apparatus 14A on the uplink side and the relay apparatus 15A to calculate the total value of 170 ns. Thus, the calculation is performed for each of the relay apparatuses 13A and 14A on the uplink side.

The selection unit 64 selects, as the optimal path, the transmission path for the minimum value of 170 ns from the plurality of the calculated total values of 180 ns and 170 ns. The transmission unit 65 transmits the information on the selected optimal path to the relay apparatus 14A on the uplink side related to the optimal path in the information.

According to such a configuration, the following effects are obtained. The optimal path information received in the relay apparatus 14A on the uplink side indicates that the optimal path is a next transmission path having the minimum total value of total MTIE values between the master apparatus and the plurality of relay apparatuses. That is, the optimal path information indicates the transmission path extending from the relay apparatus 15A at the edge via the relay apparatus 14A to the master apparatus 12. Thus, the relay apparatus 14A that has received the optimal path information may communicate through the optimal path through which the time information from the master apparatus 12 is received and transmitted to the relay apparatus 15A at the edge on the basis of the optimal path information.

Configuration of Third Embodiment

Figure 5:
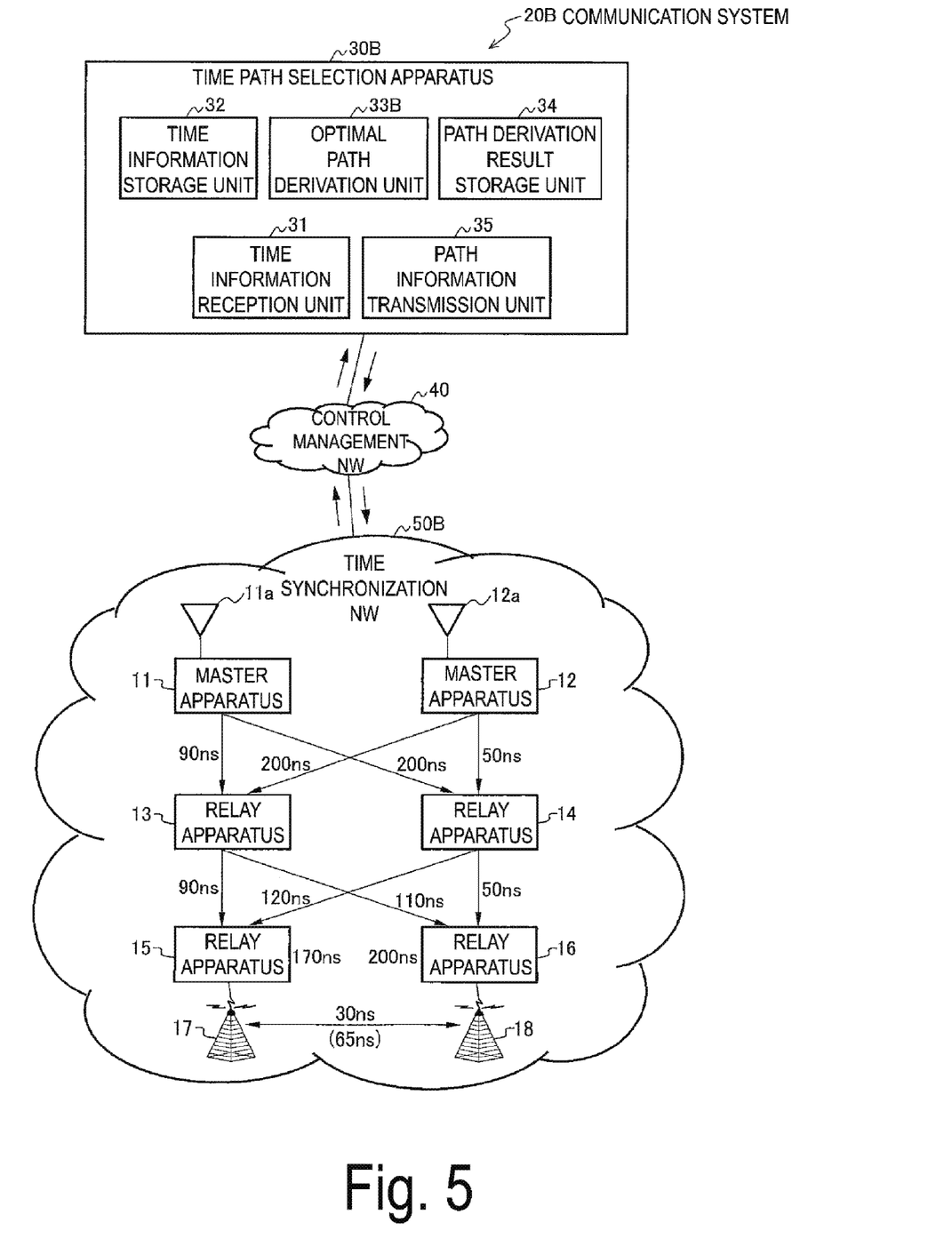
FIG. 5 is a block diagram illustrating a configuration of a communication system employing a time path selection apparatus according to a third embodiment of the present disclosure.

FIG. 5 is a block diagram illustrating a configuration of a communication system employing a time path selection apparatus according to a third embodiment of the present invention. Note that in a communication system 20B illustrated in FIG. 5, the same components as those in the communication system 20 according to the first embodiment illustrated in FIG. 1 are allotted with the same reference numerals and descriptions thereof will be omitted as appropriate.

The communication system 20B according to the third embodiment illustrated in FIG. 5 differs from the communication system 20 (FIG. 1) according to the first embodiment in a calculation process of an optimal path derivation unit 33B (derivation unit 33B) of a time path selection apparatus 30B. Furthermore, the communication system 20B differs from the communication system 20 in that in a time synchronization NW 50B, the relay apparatuses 15 and 16 at the edges are connected with mobile radio base stations 17 and 18, respectively.

The base stations 17 and 18 can optimally communicate if a difference (relative error) in total MTIE value on the uplink side between the relay apparatuses 15 and 16 to which the base stations 17 and 18 are individually connected is small, and the total MTIE value in each of the relay apparatuses 15 and 16 is smaller.

The derivation unit 33B performs the following calculation process on the basis of the MTIE values between each of the master apparatuses 11 and 12 and each of the relay apparatuses 13 to 16 stored in the time information storage unit 32.

That is, the derivation unit 33B performs calculation to evaluate each of the total MTIE values, so that between two apparatuses, that is, the relay apparatus 15 at the edge, connected with the base station 17 being one of the base stations 17 and 18 and the relay apparatus 16 at the edge, connected with the base station 18 being the other of the base stations 17 and 18, a difference (relative error) in total MTIE value between each of the master apparatuses 11 and 12 and the relay apparatuses 15 and 16 at the edges is equal to or less than a prescribed value, and the total MTIE value in each of the relay apparatuses 15 and 16 is the minimum value. Furthermore, the derivation unit 33B derives, as the optimal path in each of the relay apparatuses 15 and 16 at the edges, the transmission path for the total MTIE value of each of the relay apparatuses 15 and 16 at the edges, where the total MTIE value is evaluated in the above calculation.

For example, as illustrated in FIG. 5, it is assumed that the prescribed value of the difference between the relay apparatuses 15 and 16 at the edges is previously determined as 65 ns. In this case, the derivation unit 33B evaluates the total MTIE value (total MTIE value on a first side) of each of the transmission paths between each of the master apparatuses 11 and 12 and the relay apparatus 15 at one of the edges, and the total MTIE value (total MTIE value on a second side) of each of the transmission paths between each of the master apparatuses 11 and 12 and the relay apparatus 16 at the other of the edges.

Firstly, there are four total MTIE values (11) to (14) of all the transmission paths between each of the master apparatuses 11 and 12 and the relay apparatus 15 at one of the edges, as follows:

(11) The total MTIE value from the master apparatus 11 to the relay apparatus 15 at the edge via the relay apparatus 13 is 90 ns+90 ns=180 ns.
(12) The total MTIE value from the master apparatus 11 to the relay apparatus 15 at the edge via the relay apparatus 14 is 200 ns+120 ns=320 ns.
(13) The total MTIE value from the master apparatus 12 to the relay apparatus 15 at the edge via the relay apparatus 13 is 200 ns+90 ns=290 ns.
(14) The total MTIE value from the master apparatus 12 to the relay apparatus 15 at the edge via the relay apparatus 14 is 50 ns+120 ns=170 ns.

Next, there are four total MTIE values (21) to (24) of all the transmission paths between each of the master apparatuses 11 and 12 and the relay apparatus 16 at the other of the edges, as follows:

(21) The total MTIE value from the master apparatus 11 to the relay apparatus 16 at the edge via the relay apparatus 14 is 200 ns+50 ns=250 ns.
(22) The total MTIE value from the master apparatus 11 to the relay apparatus 16 at the edge via the relay apparatus 13 is 90 ns+110 ns=200 ns.
(23) The total MTIE value from the master apparatus 12 to the relay apparatus 16 at the edge via the relay apparatus 14 is 50 ns+50 ns=100 ns.
(24) The total MTIE value from the master apparatus 12 to the relay apparatus 16 at the edge via the relay apparatus 13 is 200 ns+110 ns=310 ns.

In this case, total MTIE values under the first condition where the difference between the relay apparatuses 15 and 16 at the edges is equal to or less than the prescribed value of 65 ns include the total MTIE value at one of the edges in (11) to (14) being 180 ns, and the total MTIE value at the other of the edges in (21) to (24) being 200 ns. Furthermore, the total MTIE values under the first condition include the total MTIE value at the one of the edges being 320 ns and the total MTIE value at the other of the edges being 310 ns. In addition, there may be a plurality of combinations.

However, the second condition is a condition where the total MTIE value in each of the relay apparatuses 15 and 16 is minimum, and thus, if both the first and second conditions are satisfied, the total MTIE value at the one of the edges is 170 ns and the total MTIE value at the other of the edges is 200 ns. That is, in this example, the derivation unit 33B derives, as the optimal path, each of the transmission paths for the relay apparatuses 15 and 16 at the edges in a case where the total MTIE value at one of the edges is 170 ns and the total MTIE value at the other of the edges is 200 ns.

As a result, it is possible to appropriately communicate between the mobile base stations 17 and 18 respectively connected to the relay apparatuses 15 and 16 at the edges.

In addition, a specific configuration can be changed as appropriate without departing from the spirit of the present invention.

REFERENCE SIGNS LIST 11, 12 Master apparatus
13 to 16, 13A to 16A Relay apparatus
17, 18 Base station
20, 20A, 20B Communication system
30, 30B, 60 Time path selection apparatus
31 Time information reception unit
32 Time information storage unit
33, 33B Optimal path derivation unit
34 Path derivation result storage unit
35 Path information transmission unit
40 Control management NW
50, 50B Time synchronization NW
61 Uplink MTIE value storage unit
62 Uplink apparatus minimum value reception unit
63 Total value calculation unit
64 Optimal path selection unit
65 Optimal path transmission unit
66 Optimal path reception unit

The invention claimed is:

1. A time path selection apparatus for selecting, based on Maximum Time Interval Error (MTIE) values evaluated in a plurality of relay apparatuses, a transmission path employed for time synchronization between a plurality of master apparatuses and a first relay apparatus in the plurality of relay apparatuses, the plurality of master apparatuses configured to transmit time information serving as a reference and the first relay apparatus configured to receive the time information via the plurality of relay apparatuses to achieve the time synchronization, wherein the time path selection apparatus comprises:
   a reception unit configured to receive MTIE values evaluated by all relay apparatuses in the plurality of relay apparatuses that are connected to downlink transmission paths of master apparatuses in the plurality of master apparatuses; and
   a derivation unit configured to evaluate a total MTIE value for each of a first plurality of transmission paths between the first relay apparatus and the plurality of master apparatuses via the plurality of relay apparatuses, and derive a first transmission path having a minimum total MTIE value out of the total MTIE values for the first plurality of transmission paths, as the transmission path employed for the time synchronization.

2. The time path selection apparatus according to claim 1, further comprising:
   a transmission unit configured to transmit optimal path information to one of the plurality of master apparatuses, the first relay apparatus, and a second relay apparatus in the plurality of relay apparatuses on a transmission path indicated in the optimal path information, wherein the optimal path information is related to information on the transmission path employed for the time synchronization derived by the derivation unit.

3. The time path selection apparatus according to claim 1, wherein the derivation unit is configured to evaluate (i) a total MTIE value for each transmission path in the first plurality of transmission paths between the first relay apparatus and the plurality of master apparatuses and (ii) a total MTIE value for each transmission path in a second plurality of transmission paths between a second relay apparatus in the plurality of relay apparatuses and the plurality of master apparatuses, so that a difference in value between a total MTIE value for one of the first plurality of transmission paths and a total MTIE value for one of the second plurality of transmission paths is less than or equal to a prescribed value, and derive the first transmission path having the minimum total MTIE value out of the total MTIE values for the first plurality of transmission paths and a second transmission path having a minimum total MTIE value out of the total MTIE values for the second plurality of transmission paths, as transmission paths employed for the time synchronization.

4. A time path selection method comprising:

selecting, based on Maximum Time Interval Error (MTIE) values evaluated in a plurality of relay apparatuses, a transmission path employed for time synchronization between a plurality of master apparatuses and a first relay apparatus in the plurality of relay apparatuses, the plurality of master apparatuses configured to transmit time information serving as a reference and the first relay apparatus configured to receive the time information via the plurality of relay apparatuses to achieve the time synchronization;

receiving MTIE values evaluated by all relay apparatuses in the plurality of relay apparatuses that are connected to downlink transmission paths of master apparatuses in the plurality of master apparatuses; and evaluating a total MTIE value for each of a first plurality of transmission paths between the first relay apparatus and the plurality of master apparatuses via the plurality of relay apparatuses; and deriving a first transmission path having a minimum total MTIE value out of the total MTIE values for the first plurality of transmission paths, as the transmission path employed for the time synchronization.

5. The time path selection method according to claim 4, further comprising:

transmitting optimal path information to one of the plurality of master apparatuses, the first relay apparatus, and a second relay apparatus in the plurality of relay apparatuses on a transmission path indicated in the optimal path information, wherein the optimal path information is related to information on the transmission path employed for the time synchronization derived by the derivation unit.

6. The time path selection method according to claim 4, further comprising:

evaluating (i) a total MTIE value for each transmission path in the first plurality of transmission paths between the first relay apparatus and the plurality of master apparatuses and (ii) a total MTIE value for each transmission path in a second plurality of transmission paths between a second relay apparatus in the plurality of relay apparatuses and the plurality of master apparatuses, so that a difference in value between a total MTIE value for one of the first plurality of transmission paths and a total MTIE value for one of the second plurality of transmission paths is less than or equal to a prescribed value; and deriving the first transmission path having the minimum total MTIE value out of the total MTIE values for the first plurality of transmission paths and a second transmission path having a minimum total MTIE value out of the total MTIE values for the second plurality of transmission paths, as transmission paths employed for the time synchronization.

7. A time path selection method comprising:

storing a minimum Maximum Time Interval Error (MTIE) value of MTIE values between a first relay apparatus in a plurality of relay apparatuses and each of a plurality of master apparatuses or each of the plurality of relay apparatuses other than the first relay apparatus, which are directly connected to an uplink side of the relay apparatus and a path ID of a transmission path for the minimum MTIE value;

receiving, from each of the plurality of relay apparatuses that are directly connected to the uplink side, a minimum MTIE value stored in each of the respective relay apparatus and a path ID of a transmission path for the minimum MTIE value calculating, for each of the plurality of relay apparatuses on the uplink side, a total value obtained by totaling the minimum MTIE value from the respective relay apparatus on the uplink side related to the received path ID and a MTIE value between the respective relay apparatus on the uplink side and the first relay apparatus;

selecting, as the transmission path employed for the time synchronization, a transmission path for a minimum value of the calculated total value for each of the plurality of relay apparatuses on the uplink side; and transmitting information on the selected transmission path employed for the time synchronization to the relay apparatus on the uplink side related to the transmission path in the information.

* * * * *